3,520,752
METHOD OF MAKING LIGHT POLARIZING PATTERNS
John F. Dreyer, 9854 Zig Zag Road, Cincinnati, Ohio 45242
No Drawing. Continuation-in-part of application Ser. No. 404,138, Oct. 15, 1964. This application Mar. 1, 1968, Ser. No. 709,803
Int. Cl. B44c 1/22
U.S. Cl. 156—234    3 Claims

ABSTRACT OF THE DISCLOSURE

Methods for making patterns comprising areas different with respect to their light polarizing properties by selective removal of portions of a continuous polarizing film, such as of a dichroic dye, from a carrier therefor to define all or a portion of said areas. Selective removal may be by destructive removal of the dye film from the carrier, or by transfer of portions thereof to a receptor surface.

---

This application is a continuation-in-part of copending patent application Ser. No. 404,138 filed Oct. 15, 1964, now abandoned.

The present invention relates to methods of making and using light-polarizing films, and relates in particular to the manufacture of patterns comprising areas which are different with respect to their light-polarizing properties. More in particular, the present invention relates to the manufacture of such polarizing patterns by selective removal of portions of an integral light-polarizing film from a carrier therefor.

It is known in the prior art that certain materials go through a metamorphic, "liquid crystalline" or "nematic" state in which their molecules fall into parallelism. In U.S. Pat. 2,400,877 it is shown that this natural tendency to alignment can be utilized for the polarization of light by imposing a uniform orienting influence on such materials at the time they enter into the nematic state. Even the relatively slight orienting force resulting from rubbing or brushing a surface on which a nematic material is supported suffices to direct the alignment of molecules along desired lines of orientation. Other molecules then orient in parallelism by the nature of their nematic behavior.

It is shown in U.S. Pat. 2,524,286 that a film of dichroic dye uniformly oriented in this manner can be stripped from an orienting matrix on which it is formed and transferred to another receptor surface in a manner analogous to decalcomania, despite its delicate nature.

U.S. Pats. 2,440,877; 2,432,867; 2,524,286; 2,481,830; 2,484,818; 2,553,961; 2,554,659; 2,562,895; 2,603,129; 2,617,329; and 2,776,598 further describe the preparation and use of light-polarizing films formed and oriented on a carrier surface.

For many purposes, it is desirable to prepare patterns comprising areas which are different with respect to their light-polarizing properties. For example, it is particularly useful for the identification of documents to include a light-polarizing pattern in the documents, for example a segment of polarized film affixed thereto, which pattern and/or film are difficultly reproducible for one not skilled in the art. In this manner, the counterfeiting of identification papers or credit cards may be discouraged or detected by the presence of such distinctive polarized patterns on genuine cards or documents, for example by the presence of areas of polarized film mounted on or affixed to the documents. Such patterns are difficult to copy and are indistinguishable when viewed in ordinary light, but become clearly visible when viewed in polarized light. In another embodiment, a pattern or mosaic of light-polarizing sections in which the orientation of polarization differs from region to region may be desired to be imparted to a light pervious material, for example for use in producing animation effects, such as in displays.

Thus, as defined in the present specification and claims, patterns comprising areas having "different" light-polarization may include areas having no polarization effect and areas in which the degree or orientation of polarization varies from region to region.

It has not proved feasible to prepare such patterns comprising areas different with respect to their light-polarizing properties by the careful application of a material in its nematic state to selected areas of a matrix. Liquid films of material in their nematic state, i.e. suitable for orientation of the molecules thereof by a matrix, are of such low viscosity that the materials cannot be confined to selected areas of a matrix, but readily flow over all portions thereof, failing to maintain distinct boundaries around the areas in which a certain light-polarizing pattern is desired to be established. Moreover, it is extremely difficult to apply a uniform coating onto a matrix when irregularly shaped areas are to be formed.

Further, in some instances, matrixing materials may be unsuitable as ultimate carriers for a polarized film, for example because they are expensive. Or, certain substances useful as carriers may be unsuitable as a matrix for orienting a polarizing film. For example, it may be desirable to have polarizing films on paper as a carrier, although paper is impractical as a matrix material for orienting the film. In these last-mentioned cases, the transfer of selected portions of a polarizing dye film from a suitable matrix to a suitable support is desirable if the same material cannot simultaneously serve as a matrix and a support.

According to the present invention, patterns having areas of differing light polarizing properties, in which, it is to be understood, areas also having no light polarizing properties may be included, are prepared by the formation of an integral, coherent, or continuous polarizing film on a suitable matrix or carrier, followed by selective removal of portions of the film from the carrier to create all or a portion of the desired pattern comprising areas heterogenous with respect to their light-polarizing properties.

The preparation of the integral polarizing film is as in the prior art, i.e. by application of a nematic dichroic dye to an orienting matrix surface bearing an orienting pattern established therein, for example, by rubbing or brushing prior to application of the dye. This matrix or "master" can be made of any material which is or can be oriented to retain a polarizing pattern, for example glass, plastics, minerals, metals, or the like. Advantageously, the surface is non-porous. The orienting pattern formed in the matrix or master need not be uniform, i.e., the direction of orientation may vary from area to area, resulting in different orientation of the dichroic dye applied thereto in its nematic state. Thus, the polarizing film formed on the matrix or master may itself vary from area to area with respect to its light polarizing properties. However, its characteristic feature, so far as the present invention is concerned, is its coherent, continuous, or integral nature: the film is cast on the matrix or master as a continuous film, without any attempt at selective formation of polarizing films on certain preferred areas, whether these areas are of the same or of a different orientation.

The present invention resides in the formation of polarizing light patterns by a selective disruption of this integral, coherent, or continuous film by selective removal of portions therof. A first method for selectively removing portions of the polarizing film from the master or matrix involves selective protection of portions of the film and physical or chemical attack or removal of unprotected portions of the film. Thus, in a simple embodiment, a protective stencil can be used in connection with the integral film and non-protected areas of the film mechanically removed by abrasion, such as by rubbing. Alternatively, a stencil impermeable to radiation, such as heat or ultraviolet light, may be employed to protect desired areas of the integral or continuous polarizing film. Unprotected areas are then irradiated to destroy the dye film.

In a further embodiment, the integral or continuous dye film may be coated with a light-sensitive photo resist. The film, so treated, is then exposed to imaging radiation defining a pattern to be copied. In light-struck areas the photo resist hardens to form a hard protective coating over the light-polarizing film. In those areas which have not been struck by light, the unhardened photo resist and underlying dichroic dye film can then be removed by mechanical or chemical means, e.g. by abrasion or solvent removal, to leave a protected polarizing film on the matrix or master.

In all of the embodiments described above, the orienting matrix on which the integral dye film is cast, and from which selective portions are removed by one or more of the techniques described, may serve as the ultimate carrier for the polarizing light pattern. Alternatively, the polarizing film remaining on the carrier after selective removal of portions therefrom may be transferred to an ultimate support or carrier sheet therefor. A transfer of the remaining polarizing film from the matrix or carrier is suitably effected by contacting the film and matrix with a tacky or adhesive receptor surface which picks up and removes the film from the carrier sheet. Materials particularly suitable as receptor surfaces are plastics, for example polycarbonate plastics or terephthalate polyester films such as "Videne." Other plastics include "Ethocell" transparent ethyl cellulose films, cellulose acetate butyrate, and cellulose acetate. Other suitable terephthalic polyester films are commercially available, for example, under the names "Mylar" and "Terafilm." For additional details on this and on other suitable plastic receptor surfaces, see "Polymers and Resins," Golding, Van Nostrand, p. 285; U.S. Pat. 2,965,613; or the Soc. of Photograph. Eng. Jour. 17 No. 10, pp. 1–5 (1961).

If necessary or desirable, thermoplastics of this type which are not already tacky or adhesive may be tackified or made adhesive by heating to or near their softening points, by softening with a solvent, or by inclusion of plasticizers. In this manner, the adhesiveness of the receptor surface for the polarizing film is increased above the adhesiveness of the matrix or master therefor, and the film transfers to the receptor surface on contact therewith. Other tacky receptors include many pressure-sensitive surfaces, on which there is a large body of prior art to guide the practitioner of the present invention.

In another embodiment of the invention, selective removal of portions of an integral film from a matrix or master is effected by vacuum.

According to still another embodiment of the present invention, selective removal of portions of a polarizing film from a matrix or master is effected in a single step by contact of a supported integral, continuous, or coherent polarizing film with a receptor sheet having thereon a pattern of selected areas which have been made adhesive. For example, a receptor surface of a plastic of the type earlier described herein can be heated in selected areas thereof, or treated with a solvent in selected areas, to render the treated areas tacky and more adhesive than surrounding areas. When such a receptor surface is contacted with a supported dichroic film, the film adheres to the areas made selectively adhesive, and is transferred thereto. In those areas of the receptor sheet which are not made adhesive, or which have not been made more adhesive for the dye film than its underlying support or matrix, the dye film is not transferred. According to this embodiment, a pattern of polarizing film is formed in the matrix by untransferred portions of the original integral film, and in the receptor sheet by portions of the original dye film which have been selectively transferred thereto.

In a further embodiment of the present invention, selective removal of portions of an integral, coherent, or continuous polarizing film from a carrier or matrix surface is effected by rendering the carrier, master, or matrix surface selectively adherent to the polarizing film formed thereon from a dichroic dye in its nematic state. Such a selective adhesiveness of the carrier layer for a polarizing film can be achieved in a variety of ways. For example, the matrix or carrier may be made of different materials. Thus, it has been found that the adhesiveness of metallic aluminum surfaces for a film of dichroic dye thereon is greater than for metallic gold and silver surfaces. Thus, selective adhesion in the carrier or matrix may be brought about by selective coating of a first surface, such as of aluminum, with another material such as gold or silver, e.g. by plating. The plated surface is then oriented by rubbing or brushing as known in the art, and a film of dichroic dye in its nematic state cast thereon. If the coherent dye film so formed is now contacted with a receptor surface which has been made suitably tacky or adhesive, the polarizing film can be stripped from the supporting matrix in those areas which have been plated, and retained in unplated areas.

It has also been found that for a surface of a single material such as metal, the degree of oxidation of the surface often affects the adhesiveness of the surface for a dichroic dye film. In general, the greater the degree of oxidation of a surface such as metal, the greater the adhesion of a dye film thereto.

In a manner analogous with that described above for metallic matrices, matrices of plastic or other materials having areas of differential adhesiveness may be prepared. For example, areas of a second plastic may be printed or stencilled onto a first plastic of different adhesive properties for use as a matrix, or selective areas of a single plastic may be rendered more adhesive by treatment with solvents, by selective oxidation, or the like.

Still another method of bringing about differential adhesiveness for a dye film in a matrix or carrier layer is in the degree of rubbing or brushing employed in establishing the orientation pattern. Thus, it has been found that if a matrix surface, such as of glass, plastic, or metal, is oriented by rubbing, e.g. with iron rouge, employing only a few strokes for orientation, the dichroic dye film applied thereto in its nematic state will adhere more strongly to such surfaces after drying than the same film will adhere to those portions of the matrix in which the orientation pattern has been established by rubbing with a great many strokes. Although the pressure used during the orientation, the consistency of the rubbing, the nature and composition of the rubbing tool, the nature of the matrix surface, and the like will make a difference in the number of strokes necessary to produce good differentiation in adhesion, as a practical matter orientation using on the order of ten strokes is usually found to give suitable adhesion of a dichroic dye film, whereas orientation employing a number of strokes on the order of 100 will effect a more ready release.

In those embodiments utilizing a differential adhesiveness in a matrix or carrier surface for a dichroic dye layer thereon for pattern formation, the receptor surface contacted with the dye film may suitably comprise a stripping layer applied uniformly to the dye film supported by the matrix. Thus, dye films formed on a matrix comprising areas of different adhesiveness for the dye layer can be suitably uniformly coated with a layer of lacquer which can be stripped off as a continuous film after drying. A pattern of light-polarizing film will be formed therein by those portions of the dichroic dye film which adhere thereto, with formation of a complementary light-polarizing pattern by dye retained on the matrix or carrier sheet.

A better understanding of the present invention and of its many advantages will be had by referring to the following specific examples, given by way of illustration.

In all the examples below, except where specifically noted, carrier or matrix surfaces are prepared and oriented using conventional techniques known in the art, e.g. like those taught in U.S. Pat. 2,524,286. Similarly unless otherwise noted, continuous coherent and integral films of a dichroic dye are formed on such matrix or orienting surfaces using well-known materials and methods disclosed in the aforementioned patent and/or other patents and publications.

EXAMPLE 1

A continuous coherent polarizing dye film of Amaranth W (Color Index No. 184) was applied to an oriented glass surface to form a continuous polarizing film corresponding to an orientation pattern imparted to the glass by rubbing. A thin film of a commercial photo resist solution (Kodak "KPR") was applied thereto, and dried. The photo resist film was then exposed to a desired pattern of ultraviolet radiation to harden the photo resist in light-exposed portions. The unhardened photo resist was then removed by dissolving in the solvent removers recommended for this purpose with the photo resist. The light-polarizing film was next removed from areas not protected by the hardened photo resist layer by washing with alcohol (to which the hardened photo resist is impervious), or with a 10 percent aqueous solution of sodium chloride.

The pattern retained on the glass matrix and protected by the photo resist may be transferred to a tacky receptor sheet by contact of the matrix therewith if the glass matrix is not desired as the ultimate carrier.

The same tacky receptor sheet may be used to pick up a different pattern of a light-polarizing dye in some or all of the areas in which dye is not present after the first pick-up. In this way, mosaics comprising areas of two or more different polarizing films may be formed on a surface for special effects such as animation patterns.

EXAMPLE 2

A polarized film on a glass matrix, as in Example 1, was selectively coated in portions thereof with pressure sensitive type in areas to be protected. Unprotected areas were next abraded by rubbing to remove undesired polarizing film. The remaining pattern was removed from the matrix simply by removing the pressure sensitive tape, to which the remaining dye layer adhered.

In further variations of this technique a stencil of a sturdy material such as metal, cardboard, plastic, or the like is placed in contact with the supported polarized film. Sections of the film in areas not protected by the stencil are then removed by contact of the stencilled film with a tacky receptor sheet. Either those portions of the film which have been transferred to the receptor sheet may comprise the desired pattern or materials left on the matrix under the stencil may form the desired pattern. In the latter case, the matrix with adhering dye thereon may form the ultimate carrier or the dye remaining on the matrix may now be transferred to the ultimate carrier, for example by contact of the matrix with a tackified receptor.

In still another variation, a heat-impervious or light-impervious stencil is employed, and the polarizing film in areas not protected by the stencil is destroyed by irradiation, e.g. with ultraviolet light of a short wave length destroying or bleaching the dichroic dye, or by irradiation with infrared to destroy or disrupt the dye layer by heating.

In still a further embodiment, a protective film like that of Example 1 is formed on a matrix other than by a photo resist, for instance by a coat of varnish or lacquer applied to specific areas by printing or through a stencil or silk screen. The resulting partially protected matrix is then processed as described elsewhere herein.

EXAMPLE 3

A supported dichroic dye film of the type described in Examples 1 and 2 was contacted with a vacuum roller applying vacuum to pre-selected areas of the film. The vacuum removes the polarized substrate in these pre-selected areas, leaving a pattern of polarizing film on the matrix.

EXAMPLE 4

A dichroic dye layer was applied to a sheet of ethyl cellulose priorly oriented by rubbing to form a continuous integral coherent dichroic dye layer on said ethyl cellulose sheet. A rubber roller, selectively coated with a tacky pressure-sensitive adhesive, was rolled over the dye film. The polarized film, which is not very adherent to the ethyl cellulose film, was removed where the tacky surface was pressed into contact with it, leaving a desired dye pattern in the matrix. The dye can be easily removed from the tacky surface in many cases by means of a solvent selective for the dye but not attacking the adhesive. For example, many of the dichroic dyes useful in forming polarizing films are soluble in alcohol, which does not significantly attack pressure-sensitive adhesive layers comprising relatively high molecular weight polymers, for example.

EXAMPLE 5

A sheet of acrylic plastic was uniformly rubbed in a prescribed orientation pattern using a cotton swab and a slurry of finely-divided zirconium oxide. The uniformly oriented plastic layer was then protected in certain areas by a stencil, such as of perforated thin metal. The areas exposed by the stencil were rubbed further. The stencil was then removed, the surface washed clean with water, and a dichroic dye in the nematic state applied.

After the dye film was dried, the entire film was coated with a plastic lacquer. On drying, the lacquer was stripped off as a continuous film which removed those portions of the dichroic dye which lay over the more strongly rubbed areas of the matrix. The acrylic sheet could then be re-coated with additional dichroic dye in the nematic state, with or without prior removal of the dichroic dye remaining unremoved after the prior stripping process.

A similar differential adhesivity of an oriented glass matrix for a dichroic dye layer thereon may be effected by uniform formation of a pattern on the glass sheet using a felt pad and a slurry of iron rouge, with orientation being effected by rubbing for ten strokes in any prescribed pattern. After selective protection of the glass, for example by application of a pressure-sensitive tape to selected portions thereof, unprotected portions are further rubbed with the felt pad and iron rouge slurry in a prescribed pattern as before but employing about 100 strokes.

After the removal of the protective tape, and thorough washing of the matrix, the surface is coated with a polarizing dye solution and dried to form a polarizing film. The film is then contacted with a receptor surface of "Videne" polyester plastic heated to its softening point to have a tacky surface. The tackified plastic is contacted with the film and peeled off after cooling. Those portions of the light-polarizing film in contact with the matrix surface having the extensive rubbing will adhere to the plastic receptor layer. The film will remain on the glass matrix in those areas receiving only minimal rubbing.

The plastic receptor surface may in the alternative be tackified by the incorporation thereinto of a suitable plasticizer, such as tricresyl phosphate, or by wetting with a solvent such as methyl ethyl ketone.

EXAMPLE 6

A polarizing film formed on an oriented glass layer as in the previous example was contacted with a polyester receptor surface which had been pre-heated in a selected pattern to render it tacky in heated portions. On cooling, the receptor surface was peeled from the polarizing layer. Polarizing film had been transferred to the receptor surface in those areas where the film had been tackified.

An alternative method for tackifying the receptor layer in selected portions thereof is by contacting the receptor surface with a solvent, e.g. by printing a pattern of solvent thereon to tackify the plastic surface in selective areas.

EXAMPLE 7

A matrix layer was prepared by providing an aluminum plate with a protective coating in selected areas. Unprotected areas of the aluminum sheet were next electrolytically plated with gold. After the plating procedure, the protective layer was removed and the entire plate, now comprising a gold-plated pattern on an aluminum substrate, was rubbed to effect orientation of the surface.

A dichroic dye solution was next applied thereto in the nematic state and dried to form a light-polarizing film.

On contact of the film with a receptor sheet, i.e. either a uniformly tackified plastic or a uniform strippable layer of lacquer, those portions of the polarizing film overlying gold-plated areas of the matrix sheet were removed by the receptor layer. Those portions of the film overlying the aluminum portions of the matrix sheet were retained on the matrix layer.

If desired, the portions remaining on the aluminum matrix layer may be removed by subsequent contact of the layer with a more strongly tackified receptor.

In another variation of this embodiment of the invention, a film of "Videne" polyester is coated by printing in specific areas with ethyl cellulose dissolved in butyl alcohol. After evaporating the solvent, the entire surface is oriented by gentle rubbing with a felt pad and a rouge slurry. After removal of the rouge, a water solution of a polarizing dye such as Orange I (Color Index No. 150) is applied and dried to form a polarizing film.

A sheet of pressure-sensitive adhesive film such as "Scotch" tape applied to the layer will, on peeling, preferentialy remove the polarized film from those areas to which the ethyl cellulose film has been applied, to give a first polarizing pattern. The matrix layer, to which dye still adheres in the polyester portions, may be used per se as the polarizing pattern, or the dye adhering thereto may be stripped off by contact with a more highly tackified receptor surface.

What is claimed is:

1. A method for making patterns comprising areas different with respect to their light polarizing properties, which comprises selectively removing portions of a continuous polarizing film from a carrier therefor by contacting said film with a uniformly adhesive receptor surface, said carrier surface having thereon a pattern of differentially adhesive areas for selective retention of said polarizing film.

2. A method as in claim 1 wherein the desired polarizing pattern is retained on said carrier.

3. A method as in claim 1 wherein the desired polarizing pattern is formed on said receptor surface by selective removal from said carrier.

References Cited

UNITED STATES PATENTS

| 2,256,108 | 8/1941 | Blake | 156—239 |
| 3,174,888 | 3/1965 | Morgan | 156—230 |
| 3,218,926 | 11/1965 | Boone | 350—158 |
| 3,222,173 | 12/1965 | Belko | 156—16 |

JOHN T. GOOLKASIAN, Primary Examiner

J. D. SMITH, Assistant Examiner

U.S. Cl. X.R.

156—241; 161—406; 350—153